US012744693B2

(12) United States Patent
Tang et al.

(10) Patent No.: US 12,744,693 B2
(45) Date of Patent: Sep. 22, 2026

(54) DATA RECEIVING CIRCUIT AND MEMORY

(71) Applicant: CXMT Corporation, Hefei City (CN)

(72) Inventors: YuLing Tang, Hefei City (CN); Yoonjoo Eom, Hefei City (CN); Jaehun Jung, Hefei City (CN)

(73) Assignee: CXMT Corporation, Hefei City (CN)

( * ) Notice: Subject to any disclaimer, the term of this patent is extended or adjusted under 35 U.S.C. 154(b) by 0 days.

(21) Appl. No.: 18/964,422

(22) Filed: Nov. 30, 2024

(65) Prior Publication Data

US 2025/0158854 A1 May 15, 2025

Related U.S. Application Data

(63) Continuation of application No. PCT/CN2024/121374, filed on Sep. 26, 2024.

(30) Foreign Application Priority Data

Oct. 13, 2023 (CN) ........................ 202311334229.4

(51) Int. Cl.
*H04L 25/03* (2006.01)

(52) U.S. Cl.
CPC .. *H04L 25/03343* (2013.01); *H04L 25/03114* (2013.01); *H04L 2025/03783* (2013.01)

(58) Field of Classification Search
CPC ... G11C 7/10; G11C 11/4076; G11C 11/4096; G11C 27/02; H03K 3/037; H03K 5/24; H03K 5/159; H03K 7/06; H03L 7/08; H03L 7/199; H04L 25/02; H04L 25/03; H04L 25/03114; H04L 25/03343; H04L 27/00; H04L 27/14
USPC ............ 327/12, 55, 156; 375/219, 232, 260, 375/295–297, 316, 326, 371, 375
See application file for complete search history.

(56) References Cited

U.S. PATENT DOCUMENTS 11,632,114 B2 * 4/2023 Tajalli ................. H04L 25/0272 375/327
11,777,484 B2 * 10/2023 Gu ....................... H03K 5/2481 327/143
2014/0092951 A1 * 4/2014 Bhagavathula ....... H04L 7/0066 375/229

* cited by examiner

*Primary Examiner* — Shawkat M Ali
(74) *Attorney, Agent, or Firm* — Syncoda LLC; Feng Ma

(57) ABSTRACT

A data receiving circuit includes: a comparator for amplifying a voltage difference between input data and an initial reference voltage and outputting double-ended signals as a result of the amplification; and a plurality of data paths, each of the plurality of data paths receiving the double-ended signals, where an i-th data path is used to sample based on an i-th clock to obtain an i-th bit data, and the i-th data path includes: an adjustment circuit for adjusting a voltage difference between the double-ended signals based on a previous second bit data to a previous N-th bit data to generate double-ended adjustment signals; and a sampling circuit for comparing and amplifying, during a valid period of the i-th clock, a voltage difference between the double-ended adjustment signals based on the previous first bit data and outputting the i-th bit data.

15 Claims, 8 Drawing Sheets

MR10 OP<7:0>

DQ-C

103

Code generation circuit code1 code2

104

Resistance voltage divider

Vref1

Vref2

DATA RECEIVING CIRCUIT AND MEMORY

CROSS-REFERENCE TO RELATED APPLICATION(S)

This application is a continuation of International Patent Application No. PCT/CN2024/121374, filed on Sep. 26, 2024, which claims the benefit of Chinese Patent Application No. 202311334229.4, titled "DATA RECEIVING CIRCUIT AND MEMORY", filed with the China National Intellectual Property Administration (CNIPA) on Oct. 13, 2023, the disclosures of which are incorporated herein by reference in their entireties.

TECHNICAL FIELD

Embodiments of the present disclosure relate to the field of semiconductor circuit designs, and in particular, relate to a data receiving circuit and a memory.

BACKGROUND

As signal transmission rates and clock frequencies continue to increase, the impact of input data channel loss on signal quality becomes more significant, making signals in memory more susceptible to intersymbol interference (ISI) during transmission.

ISI refers to the phenomenon where previously transmitted input data affects the transmission of currently transmitted input data due to the bandwidth limitations of the input data channel. At present, feedback equalization adjustment circuits are commonly used to compensate the input data channel so as to reduce adverse effects caused by intersymbol interference. The feedback equalization adjustment circuits may utilize either a continuous time linear equalizer (CTLE) or a decision feedback equalizer (DFE).

However, the effectiveness of current memory apparatuses in improving intersymbol interference still needs improvement.

SUMMARY

Embodiments of the present disclosure provide a data receiving circuit and a memory, which are at least beneficial to improving the problem of intersymbol interference in the memory.

An embodiment of the present disclosure provides a data receiving circuit. The data receiving circuit includes: a comparator for receiving initial input data and an initial reference voltage, where the comparator is configured to amplify a voltage difference between the input data and the initial reference voltage and output double-ended signals as a result of the amplification; and a plurality of data paths, including a first data path to an M-th data path, numbered in ascending order of natural numbers, with an i-th data path being any one of the plurality of data paths, and $1 \leq i \leq M$, $M \geq 2$; each of the plurality of data paths receiving the double-ended signals, where the i-th data path is configured to sample based on an i-th clock to obtain an i-th bit data, and the i-th data path includes: an adjustment circuit for receiving a previous second bit data to a previous N-th bit data prior to the i-th bit data, with $2 \leq N \leq M$, where the adjustment circuit is configured to adjust a voltage difference between the double-ended signals based on the previous second bit data to the previous N-th bit data to generate double-ended adjustment signals; and a sampling circuit 202 for receiving the double-ended adjustment signals, the i-th clock, and a previous first bit data prior to the i-th bit data, where the sampling circuit is configured to, during a valid period of the i-th clock, compare and amplify a voltage difference between the double-ended adjustment signals based on the previous first bit data and output the i-th bit data.

The data receiving circuit adjusts the current input data based on the feedback from the previous multi-bit input data, significantly reducing the impact of ISI on the current input data. Additionally, the area of the circuit is compressed as much as possible without affecting the storage capacity of the memory.

In some embodiments, the sampling circuit further receives a first reference voltage and a second reference voltage, where a voltage value of the first reference voltage is greater than a voltage value of the second reference voltage; and comparing and amplifying the voltage difference between the double-ended adjustment signals based on the previous first bit data and outputting the i-th bit data includes: selecting, based on the previous first bit data, to equivalently increase or equivalently decrease the voltage difference between the double-ended adjustment signals by adjusting a voltage value of the i-th bit data through a voltage difference between the first reference voltage and the second reference voltage, and comparing and amplifying the voltage difference between the double-ended adjustment signals to output the i-th bit data.

In some embodiments, the double-ended adjustment signals include a first adjustment sub-signal and a second adjustment sub-signal; the sampling circuit includes: a selection adjustment circuit, configured to select, during a valid period of the i-th clock and based on a value of the previous first bit data, to use the first reference voltage to adjust a current of a branch where the first adjustment sub-signal is located and use the second reference voltage to adjust a current of a branch where the second adjustment sub-signal is located; or, to use the first reference voltage to adjust a current of a branch where the second adjustment sub-signal is located and use the second reference voltage to adjust a current of a branch where the first adjustment sub-signal is located; and a latch circuit, configured to sample and latch the i-th bit data based on the i-th clock.

In some embodiments, the selection adjustment circuit includes: a first NMOS transistor, with a control terminal for receiving the first adjustment sub-signal and a first end connected to the latch circuit; a second NMOS transistor, with a control terminal for receiving the second adjustment sub-signal, a first end connected to the latch circuit, and a second end connected to a second end of the first NMOS transistor; a first switch NMOS transistor, with a control terminal for receiving a power supply voltage and a first end connected to the second end of the first NMOS transistor; a second switch NMOS transistor, with a control terminal for receiving the i-th clock, a first end connected to a second end of the first switch NMOS transistor, and a second end being grounded; a first adjustment NMOS transistor, with a control terminal for receiving the first reference voltage and a first end connected to the first end of the second NMOS transistor; a second adjustment NMOS transistor, with a control terminal for receiving the second reference voltage, a first end connected to the first end of the first NMOS transistor, and a second end connected to a second end of the first adjustment NMOS transistor; a third switch NMOS transistor, with a control terminal for receiving the previous first bit data and a first end connected to the second end of the second adjustment NMOS transistor; a fourth switch NMOS transistor, with a control terminal for receiving the i-th clock, a first end connected to a second end of the third switch NMOS transistor, and a second end being grounded; a third adjustment NMOS transistor, with a control terminal for receiving the second reference voltage and a first end connected to the first end of the second NMOS transistor; a fourth adjustment NMOS transistor, with a control terminal for receiving the first reference voltage, a first end connected to the first end of the first NMOS transistor, and a second end connected to a second end of the third adjustment NMOS transistor; a fifth switch NMOS transistor, with a control terminal for receiving an inverted signal of the previous first bit data and a first end connected to the second end of the fourth adjustment NMOS transistor; and a sixth switch NMOS transistor, with a control terminal for receiving the i-th clock, a first end connected to a second end of the fifth switch NMOS transistor, and a second end being grounded.

In some embodiments, the latch circuit includes: a first PMOS transistor, with a first end for receiving the power supply voltage; a second PMOS transistor, with a first end for receiving the power supply voltage; a third NMOS transistor, with a control terminal connected to a control terminal of the first PMOS transistor, a first end connected to a second end of the first PMOS transistor, and a second end connected to the first end of the first NMOS transistor; a fourth NMOS transistor, with a control terminal connected to a control terminal of the second PMOS transistor, a first end connected to a second end of the second PMOS transistor, and a second end connected to the second end of the second NMOS transistor, where the control terminal of the third NMOS transistor is further connected to the first end of the fourth NMOS transistor to serve as a first output end of the latch circuit, the control terminal of the fourth NMOS transistor is further connected to the first end of the third NMOS transistor to serve as a second output end of the latch circuit, the first output end is used to output the i-th bit data, and the second output end is used to output an inverted signal of the i-th bit data; a first reset PMOS transistor, with a control terminal for receiving the i-th clock, a first end for receiving the power supply voltage, and a second end connected to the second end of the first PMOS transistor; and a second reset PMOS transistor end FP02, with a control terminal for receiving the i-th clock, a first end for receiving the power supply voltage, and a second end connected to the second end of the second PMOS transistor.

In some embodiments, the latch circuit further includes: a third reset PMOS transistor, with a control terminal for receiving the i-th clock, a first end for receiving the power supply voltage, and a second end connected to the first end of the first NMOS transistor; and a fourth reset PMOS transistor, with a control terminal for receiving the i-th clock, a first end for receiving the power supply voltage, and a second end connected to the second end of the second NMOS transistor.

In some embodiments, the data receiving circuit further includes: a code generation circuit, configured to receive a reference voltage generation code and a tap code corresponding to a previous one-bit data, generate a first reference voltage generation code based on the reference voltage generation code plus the tap code, and generate a second reference voltage generation code based on the reference voltage generation code minus the tap code, where the first reference voltage generation code is used to generate a first reference voltage, the second reference voltage generation code is used to generate a second reference voltage, and the tap code is used to match a voltage adjustment step corresponding to the previous first bit data.

In some embodiments, the data receiving circuit further includes: a resistance voltage divider, configured to generate a first reference voltage based on the first reference voltage generation code and generate a second reference voltage based on the second reference voltage generation code.

In some embodiments, the code generation circuit includes: a generation circuit, configured to generate an initial reference voltage generation code; and a control circuit, configured to provide the tap code to a first processing circuit and a second processing circuit, where the first processing circuit is configured to generate the first reference voltage generation code based on the initial reference voltage generation code plus the tap code; and the second processing circuit is configured to generate the second reference voltage generation code based on the initial reference voltage generation code minus the tap code.

In some embodiments, the generation circuit is configured to generate the reference voltage generation code corresponding to a reference voltage with a preset value or identify a configuration value of a mode register in an associated memory to generate the initial reference voltage generation code. In some embodiments, the generation circuit includes: a first sub-generation circuit, configured to identify the configuration value of the mode register in the associated memory to generate a first reference code; a second sub-generation circuit, configured to generate a second reference code corresponding to the reference voltage with the preset value; and a selection circuit, configured to select, based on a selection signal, whether to generate the initial reference voltage generation code based on the first reference code or the second reference code.

In some embodiments, the generation circuit is configured to generate the initial reference voltage generation code based on an adjusting code, wherein the adjusting code is obtained based on eye diagram data of an associated memory in a test mode.

In some embodiments, the generation circuit includes: a first sub-generation circuit, configured to identify a configuration value of a mode register in the associated memory to generate a first reference code; a second sub-generation circuit, configured to generate a second reference code based on the adjusting code; and a selection circuit, configured to select, based on a selection signal, whether to generate the reference voltage generation code based on the first reference code or the second reference code.

Another embodiment of the present disclosure provides a memory. The memory includes the data receiving circuit provided according to the above embodiments, which is at least beneficial to improving the problem of intersymbol interference in the memory.

In some embodiments, N and M are four.

BRIEF DESCRIPTION OF THE DRAWINGS

One or more embodiments are illustrated by figures in the corresponding drawings. These exemplary explanations do not constitute limitations on the embodiments, and elements with identical reference numerals in the drawings represent similar elements. Unless expressly stated otherwise, the figures in the drawings do not constitute a proportion limitation. To more clearly illustrate the technical solutions in the embodiments of the present disclosure or the conventional technology, a brief introduction to the drawings required for the description of the embodiments is given hereinafter. It is evident that the drawings described hereinafter are merely some embodiments of the present disclosure. For those of ordinary skill in the art, other drawings may also be obtained based on these drawings without creative effort.

FIG. 9 is a schematic structural diagram of a first code generation circuit according to some embodiments of the present disclosure;

DETAILED DESCRIPTION

It can be seen from the background section that the effectiveness of current memory apparatuses in improving intersymbol interference still needs improvement.

An embodiment of the present disclosure provides a data receiving circuit, which is at least beneficial to improving the problem of intersymbol interference in the memory.

Those of ordinary skill in the art can understand that in various embodiments of the present disclosure, numerous technical details are set forth to enable readers to better understand the present disclosure. However, the technical solutions claimed by the present disclosure can also be implemented even without these technical details and the various changes and modifications based on the following embodiments. The division of the following embodiments is for the convenience of description and should not constitute any limitation to the specific implementation of the present disclosure. The various embodiments may be combined or referenced with each other as long as there is no contradiction.

Figure 1:
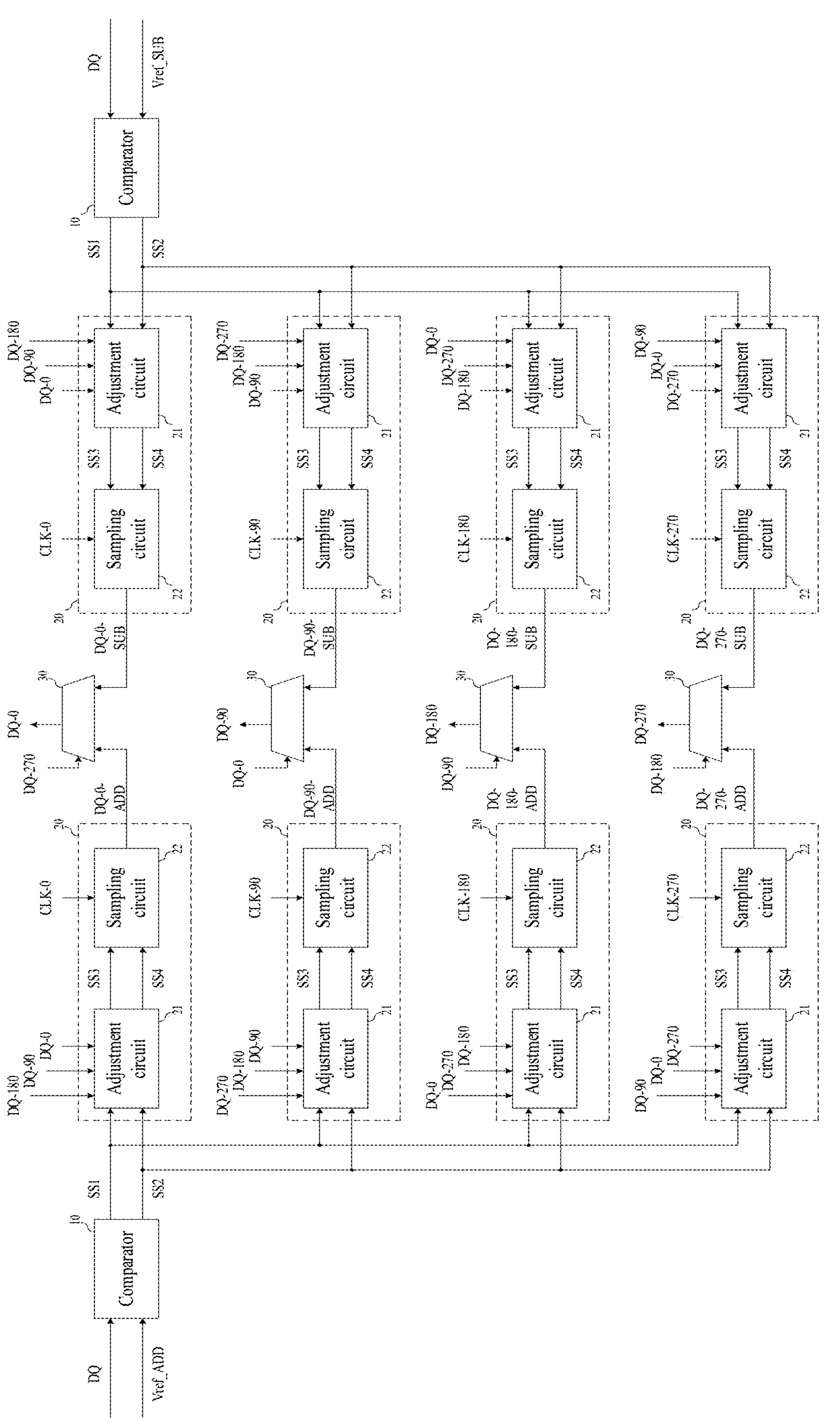
FIG. 1 is a schematic structural diagram of a data receiving circuit that performs compensation based on double reference voltages, according to some embodiments of the present disclosure.
Figure 2:
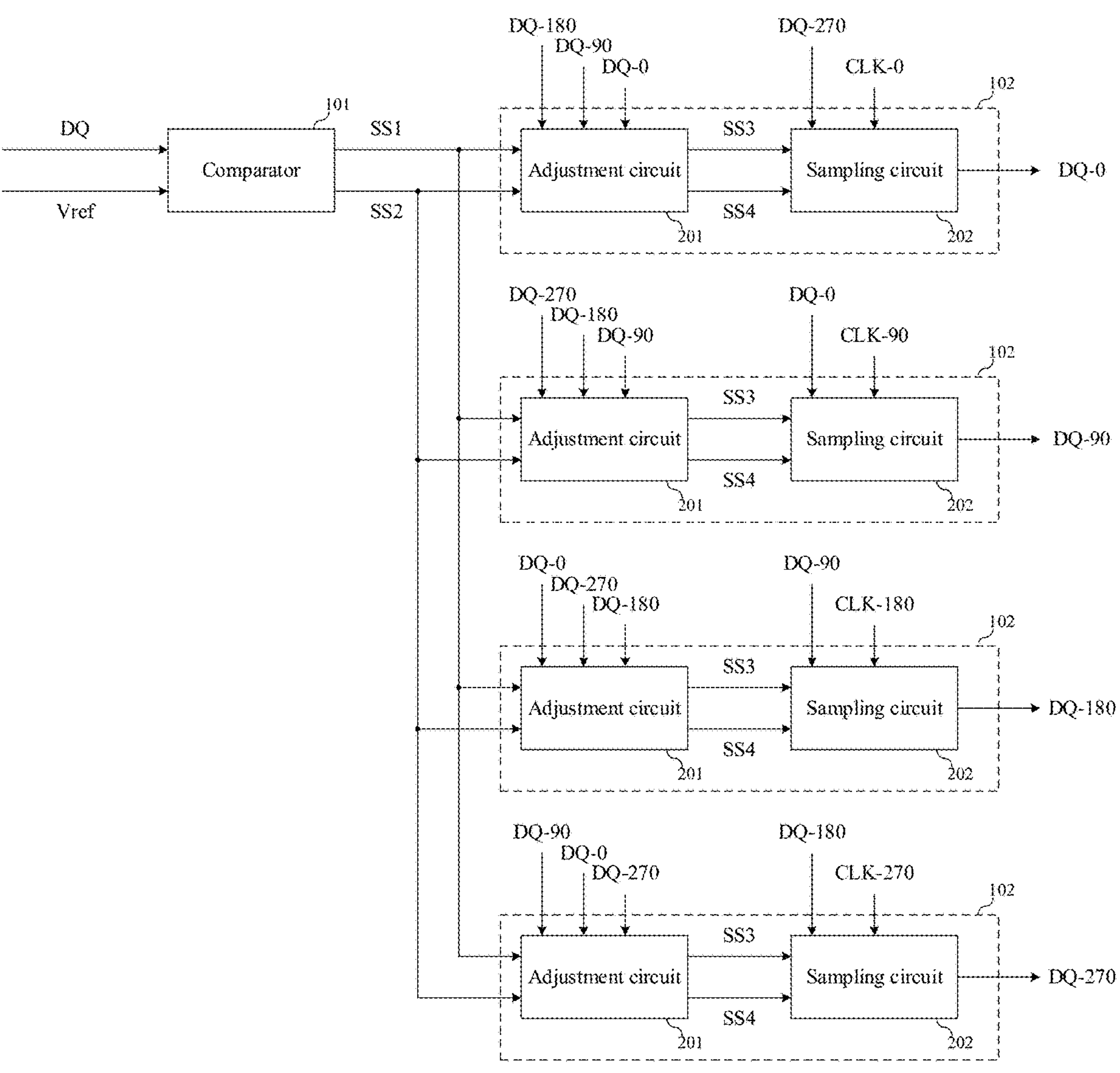
FIG. 2 is a schematic structural diagram of a data receiving circuit according to some embodiments of the present disclosure.
Figure 3:
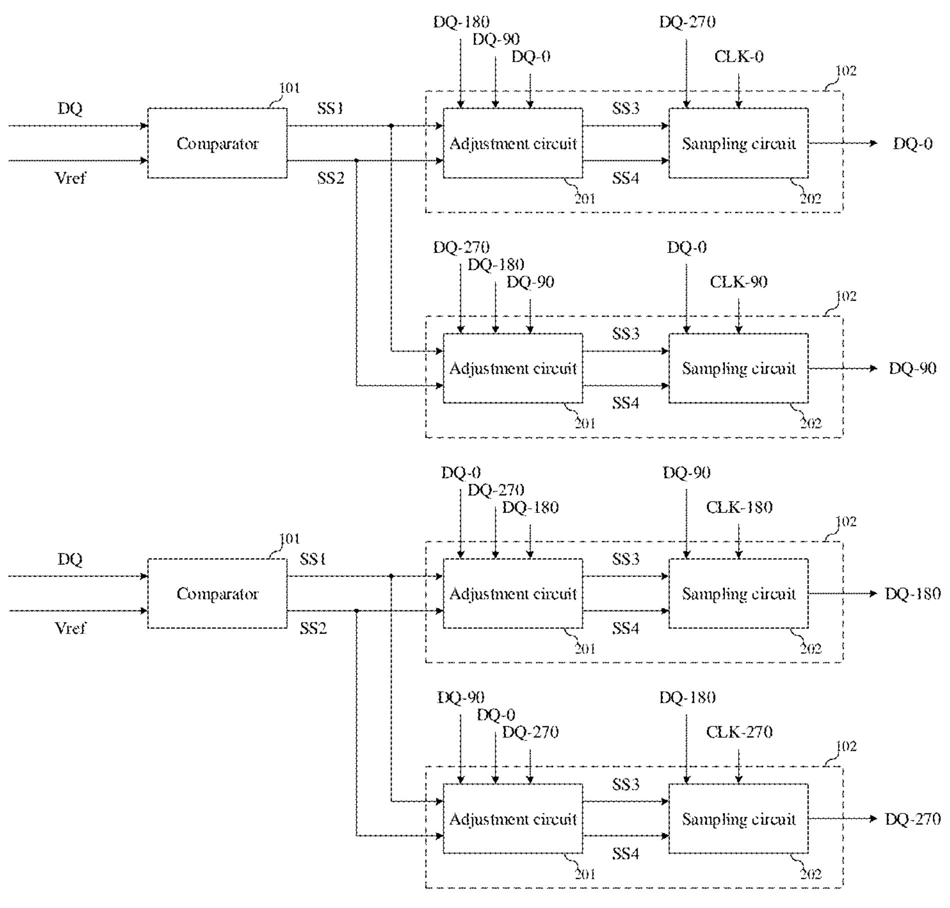
FIG. 3 is a schematic diagram of a structure with a plurality of comparators according to some embodiments of the present disclosure.
Figure 4:
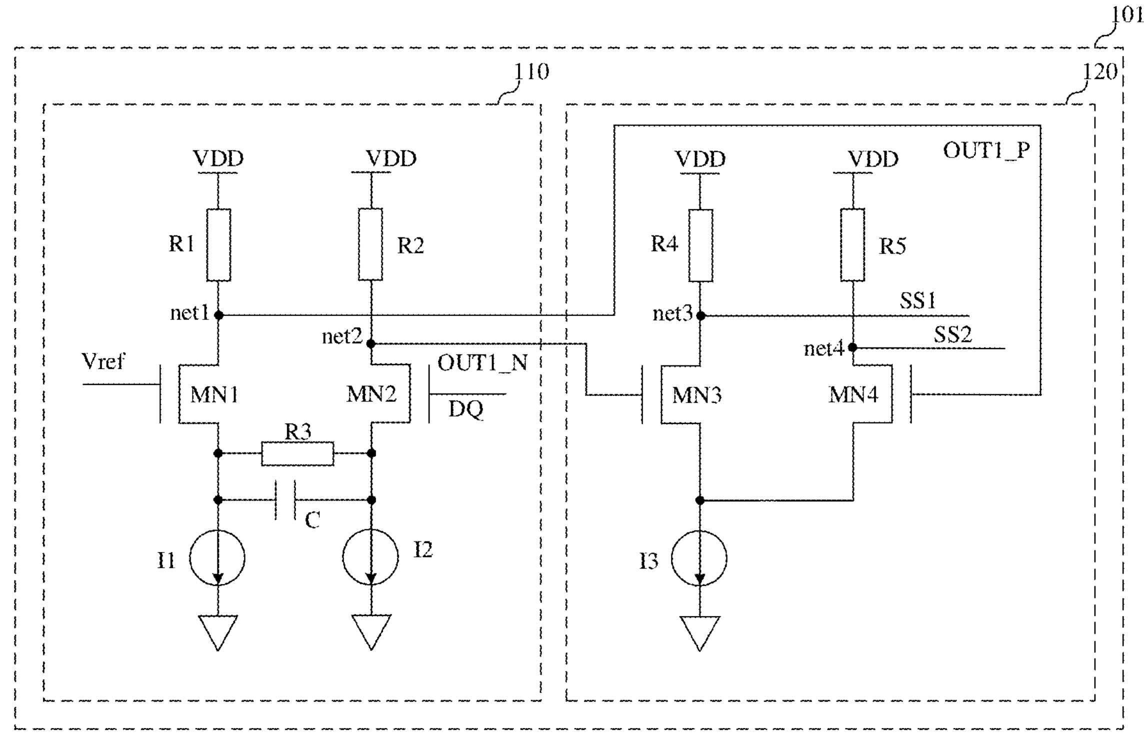
FIG. 4 is a schematic structural diagram of a comparator according to some embodiments of the present disclosure.
Figure 5:
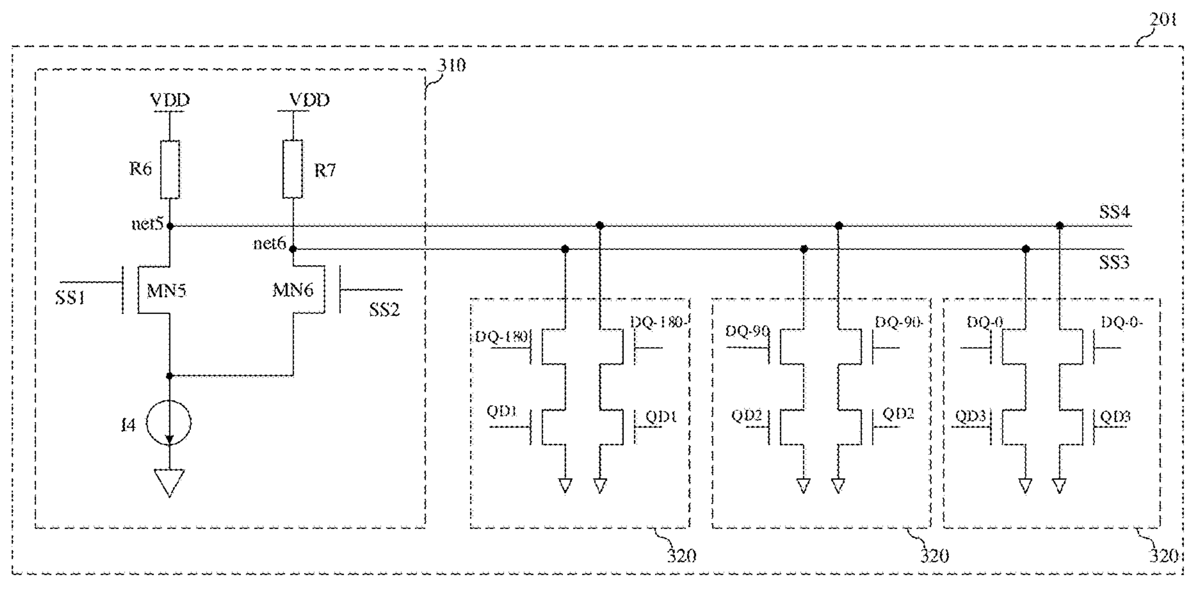
FIG. 5 is a schematic structural diagram of an adjustment circuit according to some embodiments of the present disclosure.
Figure 6:
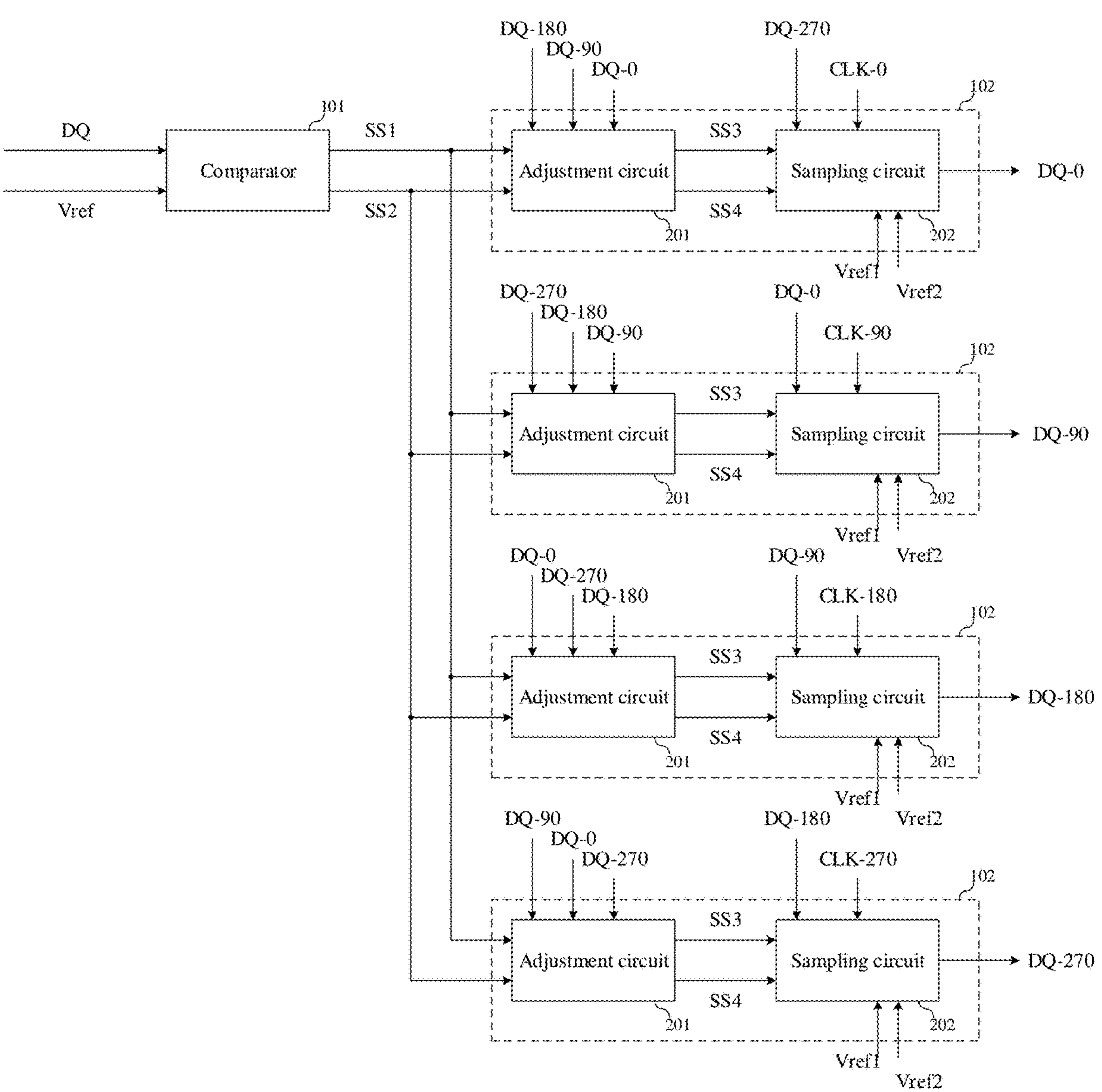
FIG. 6 is a schematic structural diagram of a data receiving circuit for adjusting output data based on double reference voltages according to some embodiments of the present disclosure.
Figures 7, 8:
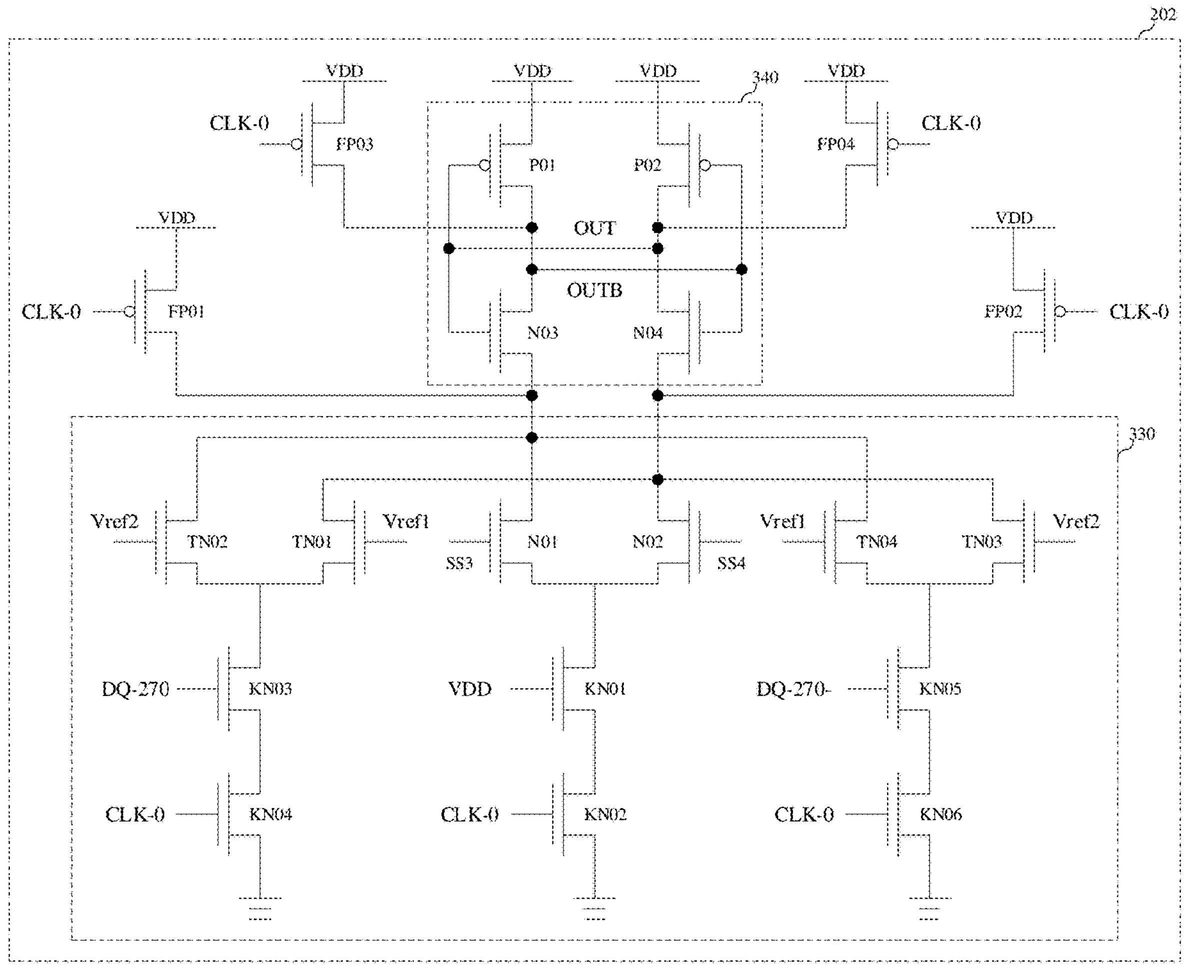
FIG. 7 is a schematic structural diagram of a sampling circuit in the data receiving circuit shown in FIG. 6 according to some embodiments of the present disclosure.
FIG. 8 is a schematic structural diagram of a code generation circuit and a resistance voltage divider according to some embodiments of the present disclosure.
Figure 10:
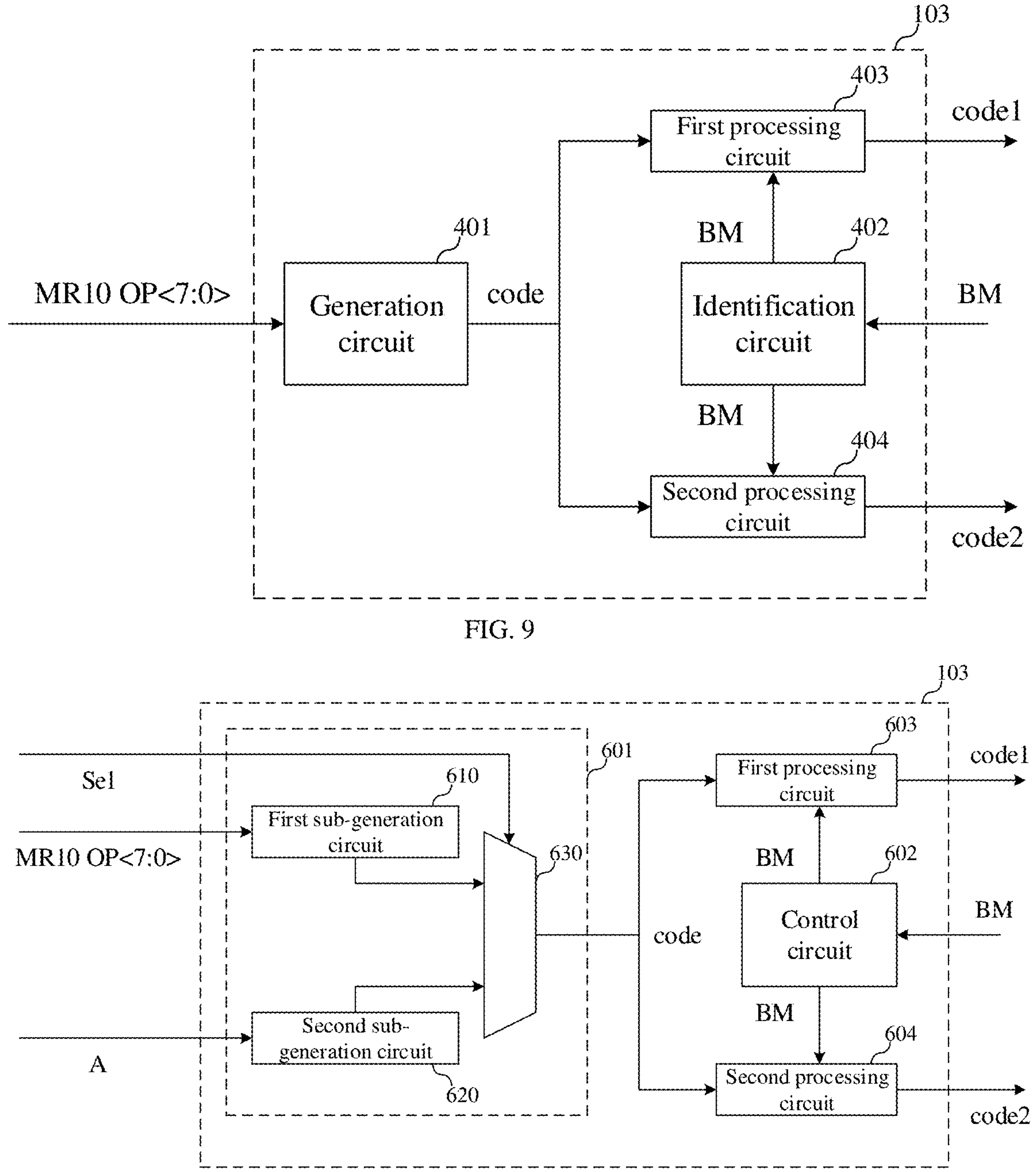
FIG. 10 is a schematic structural diagram of a second code generation circuit according to some embodiments of the present disclosure.
Figure 11:
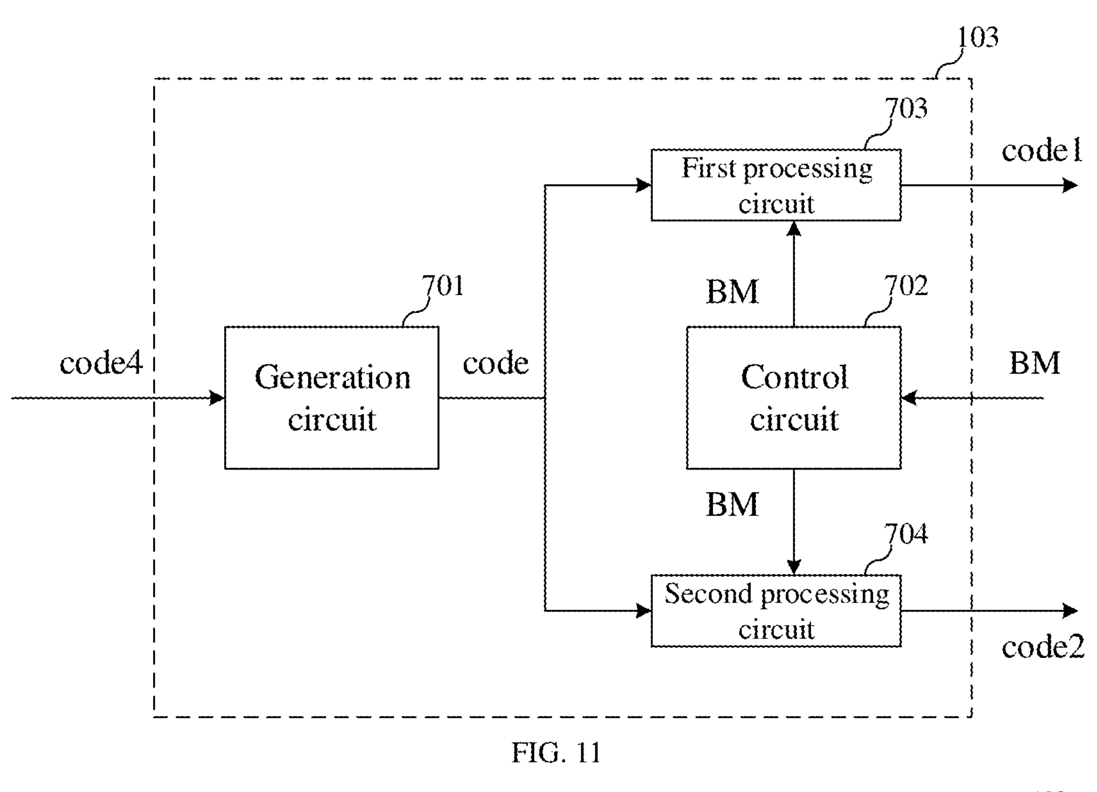
FIG. 11 is a schematic structural diagram of a third code generation circuit according to some embodiments of the present disclosure.
Figure 12:
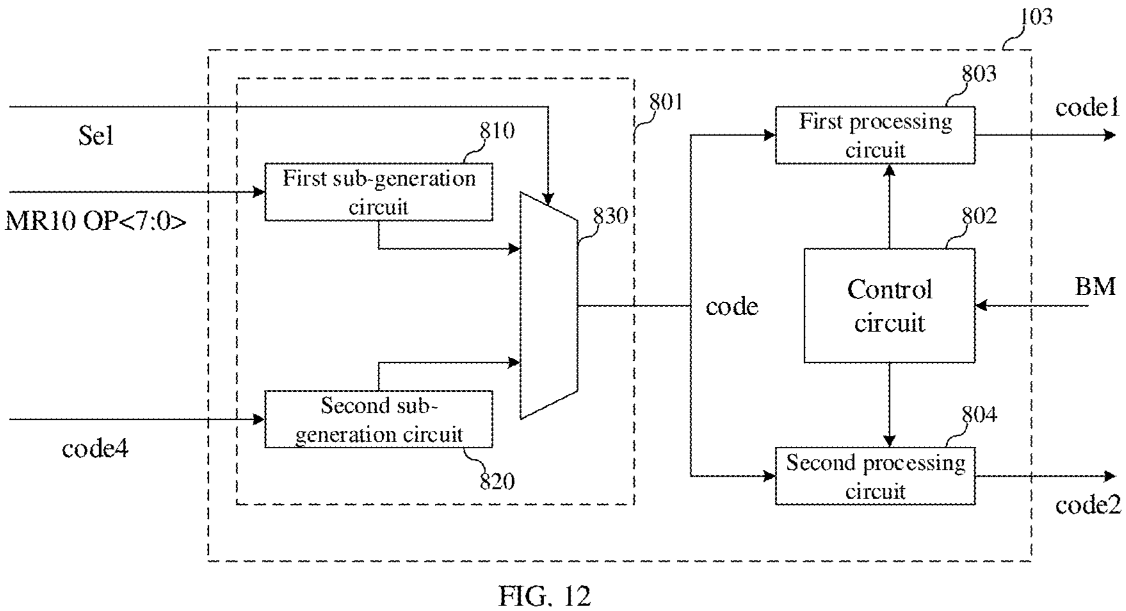
FIG. 12 is a schematic structural diagram of a fourth code generation circuit according to some embodiments of the present disclosure.

FIG. 1 is a schematic structural diagram of a data receiving circuit that performs compensation based on double reference voltages, according to the embodiments; FIG. 2 is a schematic structural diagram of a data receiving circuit according to the embodiments; FIG. 3 is a schematic diagram of a structure with a plurality of comparators according to the embodiments; FIG. 4 is a schematic structural diagram of a comparator according to the embodiments; FIG. 5 is a schematic structural diagram of an adjustment circuit according to the embodiments; FIG. 6 is a schematic structural diagram of a data receiving circuit for adjusting output data based on double reference voltages according to the embodiments; FIG. 7 is a schematic structural diagram of a sampling circuit in the data receiving circuit shown in FIG. 6 according to the embodiments; FIG. 8 is a schematic structural diagram of a code generation circuit and a resistance voltage divider according to the embodiments; FIG. 9 is a schematic structural diagram of a first code generation circuit according to the embodiments; FIG. 10 is a schematic structural diagram of a second code generation circuit according to the embodiments; FIG. 11 is a schematic structural diagram of a third code generation circuit according to the embodiments; and FIG. 12 is a schematic structural diagram of a fourth code generation circuit according to the embodiments. The following describes the data receiving circuit provided according to the embodiments in detail with reference to the drawings, specifically as follows:

The data receiving circuit may be applied to a memory, and the memory may be either a dynamic random access memory (DRAM) or a static random access memory (SRAM). In some embodiments, the data receiving circuit may be applied to a synchronous dynamic random access memory (SDRAM) and the SDRAM may be a double data rate (DDR) SDRAM, such as a DDR4 memory, a DDR5 memory, a DDR6 memory, an LPDDR4 memory, an LPDDR5 memory, or an LPDDR6 memory.

According to the different bit numbers of the input data participating in the DFE in the previously transmitted input data, the feedback equalization adjustment circuit in the data receiving circuit may be divided into one-tap, two-tap, three-tap, and four-tap equalizers. In specific applications, the feedback equalization adjustment circuit may have even more taps (i.e., the number of taps may be greater than four). A tap can be understood as a point of adjustment, meaning that the feedback equalization adjustment circuit may include a plurality of tap adjustment circuits. Each tap adjustment circuit corresponds to a tap signal, and a tap signal corresponds to the previously transmitted one-bit input data. The tap signal is used to adjust the currently transmitted input data. Specifically, the one-tap equalizer is used to adjust the current input data based on the previous one-bit input data previously transmitted, the two-tap equalizer is used to adjust the current input data based on the previous two-bit input data previously transmitted, . . . , and the n-tap equalizer is used to adjust the current input data based on the previous n-bit input data previously transmitted.

Since DDR5 usually uses four-phase clocks for data transmission, in the embodiment, the data receiving circuit provided according to the embodiment is described by using an example of a four-tap equalizer and the example does not constitute limitations on the embodiment. In other embodiments, the four-tap equalizer may be extended to an n-tap equalizer.

For four-phase clock signals, the clock signals are CLK-0, CLK-90, CLK-180, and CLK-270, respectively. The clock signal CLK-0 is used to sample and obtain the input data DQ-0, and the input data previously transmitted by the input data DQ-0 are sequentially: DQ-270, DQ-180, DQ-90, DQ-0, DQ-270, and so on. The clock signal CLK-90 is used to sample and obtain the input data DQ-90, and the input data previously transmitted by the input data DQ-90 are sequentially: DQ-0, DQ-270, DQ-180, DQ-90, DQ-0, and so on. The clock signal CLK-180 is used to sample and obtain the input data DQ-180, and the input data previously transmitted by the input data DQ-180 are sequentially: DQ-90, DQ-0, DQ-270, DQ-180, DQ-90, and so on. The clock signal CLK-270 is used to sample and obtain the input data DQ-270, and the input data previously transmitted by the input data DQ-270 are sequentially: DQ-180, DQ-90, DQ-0, DQ-270, DQ-180, and so on.

For the working principle of the decision feedback equalizer (DFE), it can be simply understood that the voltage value of the reference voltage is adjusted to avoid sampling errors in the data receiving circuit. Since the level change in the data receiving circuit resulting from the change of external input data is not completed instantaneously (a certain time is required for the level change in the data receiving circuit to match the data change), an increase in data transmission rate or clock signal frequency will reduce the time for the level change in the data receiving circuit. For example, when the external input data jumps from "0" to "1", the level in the data receiving circuit needs to be pulled up to 0.8 in an ideal case because the time for the level change in the data receiving circuit is reduced, but in reality, the level can only be pulled up to 0.6. In this case, by lowering the reference voltage, it can be ensured that the actual level of 0.6 is still greater than the reference voltage, such that the data receiving circuit can sample and obtain high-level input data. For another example, when the external input data jumps from "1" to "0", the level in the data receiving circuit needs to be pulled down to 0.1 in an ideal case because the time for the level change in the data receiving circuit is reduced, but in reality, the actual level can only be pulled down to 0.3. In this case, by increasing the reference voltage, it can be ensured that the actual level of 0.3 is still less than the reference voltage, such that the data receiving circuit can sample and obtain low-level input data.

In some embodiments, referring to FIG. 1, the data receiving circuit includes a comparator 10 and four data paths 20. The four data paths 20 are respectively used to sample initial input data DQ to obtain input data DQ-0, DQ-90, DQ-180, and DQ-270 (the phase difference between DQ-0 and DQ-90 is 90°, the phase difference between DQ-90 and DQ-180 is 90°, the phase difference between DQ-180 and DQ-270 is 90°, and the phase difference between DQ-270 and DQ-0 is) 90°. The following description takes the data path for obtaining input data DQ-O as an example for illustration. Those skilled in the art may replace corresponding signals to obtain specific implementations of other data paths, and details will not be described in the embodiment.

Specifically, the comparator 10 is used to receive initial input data DQ and a reference voltage Vref_ADD/Vref_SUB input externally and amplify the voltage difference between the initial input data DQ and the reference voltage Vref_ADD/Vref_SUB to generate double-ended signals SS1/SS2. The double-ended signals SS1/SS2 are input into the data path 20, and the data path 20 includes an adjustment circuit 21 and a sampling circuit 22. The adjustment circuit 21 is used to fine-tune the double-ended signals SS1/SS2 according to the second bit data previously transmitted and the input data previously transmitted to output double-ended adjustment data SS3/SS4; the sampling circuit 22 samples the double-ended adjustment data SS3/SS4 based on the clock signal CLK-0 to generate alternative data DQ-0-ADD/DQ-0-SUB, and then the selector 30, based on the previous first bit data DQ-270, selects between the alternative data DQ-0-ADD or the alternative data DQ-0-SUB to obtain the input data DQ-0.

More specifically, the alternative data DQ-0-ADD is generated based on the reference voltage Vref-ADD, and the alternative data DQ-0-SUB is generated based on the reference voltage Vref-SUB; the selector 30, based on the previous first bit data DQ-270, selects different alternative data DQ-0-ADD/DQ-0-SUB to obtain the input data DQ-0, i.e., selects a sampling result based on the reference voltage Vref-ADD or the reference voltage Vref-SUB.

For the data receiving circuit 10 illustrated in FIG. 1, the data receiving circuit adjusts the current input data based on the feedback from the previous multi-bit input data, significantly reducing the impact of ISI on the current input data. However, the area of the circuit may be relatively large, which may occupy a substantial portion of the memory layout in practical applications and affect the storage capacity of the memory. In addition, in the data receiving circuit 10, sampling is performed twice on the same input data based on the reference voltage Vref_ADD/Vref_SUB, and thus, the power consumption of the circuit is also relatively large.

In some embodiments, referring to FIG. 2, the data receiving circuit includes a comparator 101 and a plurality of data paths 102.

The comparator 101 is used to receive the initial input data DQ and the initial reference voltage Vref. The comparator 101 is configured to amplify the voltage difference between the initial input data DQ and the initial reference voltage Vref and output the double-ended signals SS1/SS2 as a result of the amplification.

For the amplification principle of the comparator 101, in one example, referring to FIG. 4, the comparator 101 includes an equalizer 110 and a first amplification circuit 120. The equalizer 110 is configured to compare the voltage difference between the initial input data DQ and the initial reference voltage Vref to boost a high-frequency gain of the initial input data DQ and output initial differential signal pairs OUT1_N/OUT1_P. The first amplification circuit 120 is configured to amplify the voltage difference between the initial differential signal pairs OUT1_N/OUT1_P and output the double-ended signals SS1/SS2. The double-ended signals SS1/SS2 include a first double-ended sub-signal SS1 and a second double-ended sub-signal SS2. It should be noted that the comparator 101 illustrated in FIG. 4 only includes two stages of amplification circuits (the equalizer 110 may also be regarded as one stage of amplification). In other embodiments, multiple stages of amplification circuits may continue to be connected to the input end or the output end of the first amplification circuit 120 to further amplify the voltage difference between the double-ended signals SS1/SS2. The impact of other interfering factors on the transmission accuracy of the initial input data DQ can be reduced or avoided through the multiple stages of amplification.

In one example, the equalizer 110 includes resistors R1, R2, and R3, NMOS MN1 and NMOS MN2, equalization capacitor C, and current sources I1 and I2. Specifically, the drain of MN1, serving as node net1, is connected to one end of R1, and the other end of R1 is used to receive the power supply voltage VDD; the source of MN1 is connected to the first end of I1, and the second end of I1 is grounded; the gate of MN1 is used to receive the initial reference voltage Vref. The drain of MN2, serving as node net2, is connected to one end of R2, and the other end of R2 is used to receive the power supply voltage VDD; the source of MN2 is connected to the first end of I2, and the second end of I2 is grounded; the gate of MN2 is used to receive the initial input signal DQ. R3 and C are connected in parallel to the sources of MN1 and MN2. R3 and C are connected in parallel to introduce a zero point at the high frequency for the high-frequency circuit, such that the spectrogram corresponding to the equalizer 110 exhibits a boosting effect at the high frequency, thereby increasing the high-frequency gain to offset the frequency loss introduced in the data receiving channel.

The equalizer 110 may compensate the initial input signal DQ in a continuous time to compensate for the frequency loss of the initial input signal. In some embodiments, the equalizer 110 may further include a continuous time linear equalizer (CTLE). The continuous time linear equalizer compensates for signals with loss in a continuous time.

For the input-output relationship of the equalizer 110, when the voltage of the initial input signal DQ is greater than the voltage of the initial reference voltage Vref, the degree of turn on of MN2 is greater than the degree of turn on of MN1 and the drop rate of the node voltage of net2 is greater than the drop rate of the node voltage of net1, such that the output voltage OUT1_N of net2 is less than the output voltage OUT1_P of net1; when the voltage of the initial input signal DQ is less than the voltage of the initial reference voltage Vref, the degree of turn on of MN1 is greater than the degree of turn on of MN2 and the drop rate of the node voltage of net1 is greater than the drop rate of node voltage of net2, such that the output voltage OUT1_P of net1 is less than the output voltage OUT1_N of net2.

In one example, the first amplification circuit 120 may be a gain amplifier based on the current mode, and the low-frequency gain can be changed by changing the magnitude of the bias current. With continued reference to FIG. 4, the first amplification circuit 120 includes resistors R4 and R5, NMOS MN3 and NMOS MN4, and a current source I3. Specifically, the drain of MN3, serving as node net3, is connected to one end of R4, and the other end of R4 is used to receive the power supply voltage VDD; the source of MN3 is connected to the first end of I3, and the second end of I3 is grounded; the gate of MN3 is connected to net2, the drain of MN4, serving as node net4, is connected to one end of R5, and the other end of R5 is used to receive the power supply voltage VDD; the source of MN4 is connected to the first end of I3, and the gate of MN4 is connected to net1. The magnitude of the current source I3 may be constant or adjustable. In specific applications, the current source I3 may be composed of an NMOS transistor controlled by bias voltage. In one example, the drains of MN3 and MN4 may be directly grounded if the low-frequency gain of the first amplification circuit 120 does not need to be changed.

For the double-ended signals SS1/SS2, the double-ended signals SS1/SS2 include the first double-ended sub-signal SS1 and the second double-ended sub-signal SS2, and the voltage magnitude relationship between the first double-ended sub-signal SS1 and the second double-ended sub-signal SS2 is determined based on the input relationship between the voltage of the initial input signal DQ and the voltage of the initial reference voltage Vref.

For the input-output relationship of the first amplification circuit 102, when the voltage of the initial input signal DQ is greater than the voltage of the initial reference voltage Vref, the output voltage OUT1_N of net2 is less than the output voltage OUT1_P of net1, the degree of turn on of MN4 is greater than the degree of turn on of MN3, and the drop rate of the node voltage of net4 is greater than the drop rate of the node voltage of net3, such that the voltage of the second double-ended sub-signal SS2 output by net4 is less than the voltage of the first double-ended sub-signal SS1 output by net3; when the voltage of the initial input signal DQ is less than the voltage of the initial reference voltage Vref, the output voltage OUT1_P of net1 is less than the output voltage OUT1_N of net2, the degree of turn on of MN3 is greater than the degree of turn on of MN4, and the drop rate of the node voltage of net3 is greater than the drop rate of the node voltage of net4, such that the voltage of the first double-ended sub-signal SS1 output by net3 is less than the voltage of the second double-ended sub-signal SS2 output by net4.

In some embodiments, referring to FIG. 3, the number of the comparators 101 included in the data receiving circuit is two or more, and each comparator 101 is configured to amplify the voltage difference between the initial input data DQ and the initial reference voltage Vref and output the double-ended signals SS1/SS2 as a result of the amplification.

Each comparator 101 is used to provide the double-ended signals SS1/SS2 for at least one data path 102. In the example of FIG. 3, each comparator 101 is used to provide the double-ended signals SS1/SS2 for two data paths, such that the load of the double-ended signals SS1/SS2 output by each comparator 101 is relatively small compared to the example of FIG. 2 where a single comparator 101 is used to provide the double-ended signals SS1/SS2 for four data paths. As a result, the signal quality of the input data finally obtained by the data receiving circuit is better.

It should be noted that the example of FIG. 3 is only used to illustrate that two or more comparators 101 may be arranged in the data receiving circuit, and the number of the comparators 101 is not limited. In specific applications, those skilled in the art may reasonably set the number of the comparators 101 according to the number of the data paths 102, so as to obtain input data with better quality.

With continued reference to FIG. 2, the plurality of data paths 102 include a first data path to an M-th data path, numbered in ascending order of natural numbers. The i-th data path is any one of the plurality of data paths, and each data path 102 receives double-ended signals SS1/SS2. The i-th data path is configured to sample based on the i-th clock to obtain the i-th bit data. In combination with the example of the above four-phase clock, the first data path is used to sample based on the clock signal CLK-0 to obtain the first bit data, i.e., DQ-0; the second data path is used to sample based on the clock signal CLK-90 to obtain the second bit data, i.e., DQ-90; the third data path is used to sample based on the clock signal CLK-180 to obtain the third bit data, i.e., DQ-180, and so on. The following description takes the data path for obtaining the input data DQ-O as an example for illustration. Those skilled in the art may replace corresponding signals to obtain specific implementations of other data paths, and details will not be described in the embodiment.

The i-th data path 102 includes an adjustment circuit 201 and a sampling circuit 202. The adjustment circuit 201 is used to receive the previous second bit data to the previous N-th bit data prior to the i-th bit data, where $2 \leq N \leq M$. The adjustment circuit 201 is configured to adjust the voltage difference between double-ended signals SS1/SS2 based on the previous second bit data to the previous N-th bit data to generate double-ended adjustment signals SS3/SS4. The sampling circuit 202 is used to receive the double-ended adjustment signals SS3/SS4, the i-th clock, and the previous first bit data prior to the i-th bit data. The sampling circuit 202 is configured to compare and amplify the voltage difference between the double-ended adjustment signals SS3/SS4 based on the previous first bit data during the valid period of the i-th clock and outputs the i-th bit data.

For the first data path 102, the adjustment circuit 201 is used to receive the previous second bit data to the previous N-th bit data prior to DQ-0, i.e., the input data prior to DQ-270, and includes, in sequence: DQ-180, DQ-90, DQ-0, and so on. The adjustment circuit 201 is configured to adjust the voltage difference between double-ended signals SS1/SS2 based on the input data prior to DQ-270 to generate double-ended adjusted signals SS3/SS4. The sampling circuit 202 is used to receive the double-ended adjustment signals SS3/SS4, the clock signal CLK-0, and the previous first bit data prior to DQ-0, i.e., DQ-270. The sampling circuit 202 is configured to compare and amplify the voltage difference between the double-ended adjustment signals SS3/SS4 based on DQ-270 during the valid period of the clock signal CLK-0 and output DQ-0.

For the working principle of the adjustment circuit 201, in one example, referring to FIG. 5, the adjustment circuit 201 includes a second amplification circuit 310 and a plurality of sub-adjustment circuits 320.

The second amplification circuit 310 may be a gain amplifier based on a current mode, and the low-frequency gain may be changed by changing the magnitude of the bias current. With continued reference to FIG. 5, the second amplification circuit 310 includes resistors R6 and R7, NMOS MN5 and NMOS MN6, and a current source I4. Specifically, the drain of MN5, serving as node net5, is connected to one end of R6, and the other end of R6 is used to receive the power supply voltage VDD; the source of MN5 is connected to the first end of I4, and the second end of I4 is grounded; the gate of MN5 is used to receive the first double-ended sub-signal SS1. The drain of MN6, serving as node net6, is connected to one end of R7, and the other end of R7 is used to receive the power supply voltage VDD; the source of MN6 is connected to the first end of I4, and the gate of MN6 is used to receive the second double-ended sub-signal SS2. The node net5 and the node net6 are used to output the double-ended adjustment signals SS3/SS4. The magnitude of the current source I4 may be constant or adjustable. In specific applications, the current source I4 may be composed of an NMOS transistor controlled by bias voltage. In one example, the drains of MN5 and MN6 can be directly grounded if the low-frequency gain of the second amplification circuit 310 does not need to be changed.

For the double-ended adjustment signals SS3/SS4, the double-ended adjustment signals SS3/SS4 include the first adjustment sub-signal SS3 and the second adjustment sub-signal SS4. The voltage magnitude relationship between the first adjustment sub-signal SS3 and the second adjustment sub-signal SS4 is determined based on the input relationship between the voltage of the first double-ended sub-signal SS1 and the voltage of the second double-ended sub-signal SS2.

For the input-output relationship of the second amplification circuit 310, when the voltage of the first double-ended sub-signal SS1 is greater than the voltage of the second double-ended sub-signal SS2, the degree of turn on of MN5 is greater than the degree of turn on of MN6, such that the node voltage of net5 is less than the node voltage of net6, that is, the voltage of the second adjustment sub-signal SS4 is less than the voltage of the first adjustment sub-signal SS3; when the voltage of the first double-ended sub-signal SS1 is less than the voltage of the second double-ended sub-signal SS2, the degree of turn on of MN5 is less than the degree of turn on of MN6, such that the node voltage of net5 is greater than the node voltage of net6, that is, the voltage of the second adjustment sub-signal SS4 is greater than the voltage of the first adjustment sub-signal SS3.

Each sub-adjustment circuit 320 in the plurality of sub-adjustment circuits 320 is used to correspond to the previous one-bit data, that is, for the data path 102 used to output DQ-0, the plurality of sub-adjustment circuits 320 are respectively used to correspond to the previous DQ-180, DQ-90, DQ-0, and so on. With continued reference to FIG. 5. in one example, for the leftmost sub-adjustment circuit 320, the sub-adjustment circuit 320 includes two branches and each branch includes two switching transistors, with one switching transistor used to receive the first drive signal QD1 and the other switching transistor used to receive DQ-180 or its inverted signal DQ-180−.

For the first drive signal QD1, the first drive signal QD1 is used to turn on the corresponding sub-adjustment circuit 320. For the example of FIG. 5, when the first drive signal QD1 is valid, the leftmost sub-adjustment circuit 320 is turned on, and the double-ended adjustment signals SS3/SS4 are fine-tuned based on DQ-180. Similarly, the second drive signal QD2 is used to turn on the middle sub-adjustment signal 320, and when the second drive signal QD2 is valid, the middle sub-adjustment signal 320 is turned on, and the double-ended adjustment signals SS3/SS4 are fine-tuned based on DQ-90. Similarly, the third drive signal QD3 is used to turn on the rightmost sub-adjustment signal 320, and when the third drive signal QD3 is valid, the rightmost sub-adjustment signal 320 is turned on and the double-ended adjustment signals SS3/SS4 are fine-tuned based on DQ-0.

Specifically, when DQ-180 is at a low level, it can be inferred from the ISI adjustment principle described above that for the current data DQ-0, the value of the initial reference voltage Vref needs to be reduced, and for the circuit in FIG. 5, the branch where DQ-180− is located conducts, pulling down the node voltage of net5, which indirectly reduces the value of the second adjustment sub-signal SS4. This is equivalent to increasing the value of the first double-ended signal SS1 and further equivalent to increasing the value of the initial data DQ, i.e., reducing the value of the initial reference voltage Vref. When DQ-180 is at a high level, it can be inferred from the ISI adjustment principle described above that for the current data DQ-0, the value of the initial reference voltage Vref needs to be increased, and for the circuit in FIG. 5, the branch where DQ-180 is located conducts, pulling down the node voltage of net6, which indirectly reduces the value of the first adjustment sub-signal SS3. This is equivalent to increasing the value of the second double-ended signal SS2 and further equivalent to increasing the value of the initial reference voltage Vref.

For other sub-adjustment circuit 320 in FIG. 5, their working principles are the same as that of the leftmost sub-adjustment circuit 320. Those skilled in the art may replace the data flow based on the above discussion, and details will not be described in the embodiment.

For the sampling circuit 202, the sampling circuit 202 samples the double-ended adjustment signals SS3/SS4 to output DQ-0 based on the clock CLK-0, compares, amplifies, and adjusts the voltage difference between the double-ended adjustment signals SS3/SS4 based on the previous first bit data during the sampling process to consider the impact of the previous first bit data on the current input data, thereby solving the ISI problem.

For the data receiving circuit illustrated in FIG. 5, the data receiving circuit adjusts the current input data based on the feedback from the previous multi-bit input data, significantly reducing the impact of ISI on the current input data.

Additionally, the area of the circuit is compressed as much as possible without affecting the storage capacity of the memory.

In some embodiments, referring to FIG. 6, the sampling circuit 202 further receives a first reference voltage Vref1 and a second reference voltage Vref2. The voltage value of the first reference voltage Vref1 is greater than the voltage value of the second reference voltage Vref2. Comparing and amplifying, by the sampling circuit 202, the voltage difference between the double-ended adjustment signals SS3/SS4 based on the previous one-bit data and outputting the i-th bit data includes: selecting, based on the previous first bit data, to equivalently increase or equivalently decrease the voltage difference between the double-ended adjustment signals SS3/SS4 by using the voltage difference between the first reference voltage Vref1 and the second reference voltage Vref2, and comparing and amplifying the voltage difference between the double-ended adjustment signals SS3/SS4 to output the i-th bit data.

Referring specifically to FIG. 7, the sampling circuit 202 includes a selection adjustment circuit 330 and a latch circuit 340. The selection adjustment circuit 330 is configured to select, during the valid period of the i-th clock and based on the value of the previous i-th bit data, to use the first reference voltage Vref1 to adjust the current of the branch where the first adjustment sub-signal SS3 is located and use the second reference voltage Vref2 to adjust the current of the branch where the second adjustment sub-signal SS4 is located; or, to use the first reference voltage Vref1 to adjust the current of the branch where the second adjustment sub-signal SS4 is located and use the second reference voltage Vref2 to adjust the current of the branch where the first adjustment sub-signal SS3 is located. The latch circuit 340 is configured to sample and latch the i-th bit data based on the i-th clock.

The selection adjustment circuit 330 includes a first NMOS transistor N01, where the control terminal is used to receive the first adjustment sub-signal SS3 and the first end is connected to the latch circuit 340; a second NMOS transistor N02, where the control terminal is used to receive the second adjustment sub-signal SS4, the first end is connected to the latch circuit 340, and the second end is connected to the second end of the first NMOS transistor N01; a first switch NMOS transistor KN01, where the control terminal is used to receive the power supply voltage VDD and the first end is connected to the second end of the first NMOS transistor N01; a second switch NMOS transistor KN02, where the control terminal is used to receive the i-th clock, the first end is connected to the second end of the first switch NMOS transistor KN01, and the second end is grounded; a first adjustment NMOS transistor TN01, where the control terminal is used to receive the first reference voltage Vref1 and the first end is connected to the first end of the second NMOS transistor N02; a second adjustment NMOS transistor TN02, where the control terminal is used to receive the second reference voltage Vref2, the first end is connected to the first end of the first NMOS transistor N01, and the second end is connected to the second end of the first adjustment NMOS transistor TN01; a third switch NMOS transistor KN03, where the control terminal is used to receive the previous first bit data and the first end is connected to the second end of the second adjustment NMOS transistor TN02; a fourth switch NMOS transistor KN04, where the control terminal is used to receive the i-th clock, the first end is connected to the second end of the third switch NMOS transistor KN03, and the second end is grounded; a third adjustment NMOS transistor TN03, where the control terminal is used to receive the second reference voltage Vref2 and the first end is connected to the first end of the second NMOS transistor N02; a fourth adjustment NMOS transistor TN04, where the control terminal is used to receive the first reference voltage Vref1, the first end is connected to the first end of the first NMOS transistor N01, and the second end is connected to the second end of the third adjustment NMOS transistor TN03; a fifth switch NMOS transistor KN05, where the control terminal is used to receive an inverted signal of the previous first bit data and the first end is connected to the second end of the fourth adjustment NMOS transistor TN04; and a sixth switch NMOS transistor KN06, where the control terminal is used to receive the i-th clock, the first end is connected to the second end of the fifth switch NMOS transistor KN05, and the second end is grounded.

The latch circuit 340 includes a first PMOS transistor P01, where the first end is used to receive the power supply voltage VDD; a second PMOS transistor P02, where the first end is used to receive the power supply voltage VDD; a third NMOS transistor N03, where the control terminal is connected to the control terminal of the first PMOS transistor P01, the first end is connected to the second end of the first PMOS transistor P01, and the second end is connected to the first end of the first NMOS transistor N01; a fourth NMOS transistor N04, where the control terminal is connected to the control terminal of the second PMOS transistor P02, the first end is connected to the second end of the second PMOS transistor P02, and the second end is connected to the first end of the second NMOS transistor N02. The control terminal of the third NMOS transistor N03 is also connected to the first end of the fourth NMOS transistor N04 to serve as the first output end OUT of the latch circuit 340; the control terminal of the fourth NMOS transistor N04 is also connected to the first end of the third NMOS transistor N03 to serve as the second output end OUTB of the latch circuit 340. The first output end is used to output the i-th bit data and the second output end is used to output an inverted signal of the i-th bit data. The latch circuit 340 further includes a first reset PMOS transistor FP01, where the control terminal is used to receive the i-th clock, the first end is used to receive the power supply voltage VDD, and the second end is connected to the second end of the first PMOS transistor P01; and a second reset PMOS transistor FP02, where the control terminal is used to receive the i-th clock, the first end is used to receive the power supply voltage VDD, and the second end is connected to the second end of the second PMOS transistor P02.

The working principle for the sampling circuit 202 is as follows: When the CLK-0 is low, that is, when the i-th clock is invalid, the input data DQ-0 is not generated currently, the second switch NMOS transistor KN02, the fourth switch NMOS transistor KN04, and the sixth switch NMOS transistor KN06 are all turned off, the selection adjustment circuit 330 is turned off, and the first reset PMOS transistor FP01 and the second reset PMOS transistor FP02 are turned on to reset the sampling circuit 202. When the CLK-0 is high, that is, when the i-th clock is valid, the input data DQ-0 needs to be generated currently.

If the voltage value of the initial input data DQ is greater than the voltage value of the initial reference voltage Vref, it can be inferred from the above that in this case, the voltage value of the first adjustment sub-signal SS3 is greater than the voltage value of the second adjustment sub-signal SS4, the first switch NMOS transistor KN01 is turned on based on the power supply voltage VDD, and the second switch NMOS transistor KN02 is turned on based on the CLK-0, such that the potential at the second end of the third NMOS transistor N03 is less than the potential at the second end of the fourth NMOS transistor N04. For the latch circuit 340, the potential at the first output end OUT is greater than the potential at the second output end OUTB in an ideal case, and DQ-0 is at a high level.

If the previous first bit data DQ-270 is at a high level, the third switch NMOS transistor KN03 is turned on, and the fourth switch NMOS transistor KN04 is turned on based on the CLK-0. In this case, the second adjustment NMOS transistor TN02 pulls down the potential at the second end of the third NMOS transistor N03, the first adjustment NMOS transistor TN01 pulls down the potential at the second end of the fourth NMOS transistor N04, the voltage value of the first reference voltage Vref1 is greater than the voltage value of the second reference voltage Vref2, and the pull-down capability of the first adjustment NMOS transistor TN01 is greater than the pull-down capability of the second adjustment NMOS transistor TN02, such that the degree of the potential drop at the second end of the third NMOS transistor N03 is less than the degree of the potential drop at the second end of the fourth NMOS transistor N04, which is equivalent to increasing the value of the initial reference voltage Vref. However, since the previous one-bit data DQ-270 is at a high level, the DQ-0 still needs to be sampled at a high level. The initial input data DQ does not change greatly and the increased initial reference voltage Vref does not affect the sampling of the data receiving circuit, and thus, the DQ-0 is still sampled at a low level.

If the previous first bit data DQ-270 is at a low level, the fifth switch NMOS transistor KN05 is turned on, the sixth switch NMOS transistor KN06 is turned on based on the CLK-0. In this case, the fourth adjustment NMOS transistor TN04 pulls down the potential at the second end of the third NMOS transistor N03, the third adjustment NMOS transistor TN03 pulls down the potential at the second end of the fourth NMOS transistor N04, the voltage value of the first reference voltage Vref1 is greater than the voltage value of the second reference voltage Vref2, and the pull-down capability of the fourth adjustment NMOS transistor TN04 is greater than the pull-down capability of the third adjustment NMOS transistor TN03, such that the degree of the potential drop at the second end of the third NMOS transistor N03 is greater than the degree of the potential drop at the second end of the fourth NMOS transistor N04, which is equivalent to decreasing the value of the initial reference voltage Vref. Therefore, the rising initial input data DQ can rise to a voltage value greater than that of the initial reference voltage Vref within a relatively short change time, thereby ensuring that in practice, the potential at the second end of the third NMOS transistor N03 is less than the potential at the second end of the fourth NMOS transistor N04. For the latch circuit 340, the potential at the first output end OUT is greater than the potential at the second output end OUTB and the DQ-O is at a high level.

If the voltage value of the initial input data DQ is less than the voltage value of the initial reference voltage Vref, it can be inferred from the above that in this case, the voltage value of the first adjustment sub-signal SS3 is less than the voltage value of the second adjustment sub-signal SS4, the first switch NMOS transistor KN01 is turned on based on the power supply voltage VDD, and the second switch NMOS transistor KN02 is turned on based on the CLK-0, such that the potential at the second end of the third NMOS transistor N03 is greater than the potential at the second end of the fourth NMOS transistor N04. For the latch circuit 340, the potential at the first output end OUT is less than the potential at the second output end OUTB in an ideal case, and DQ-0 is at a low level.

If the previous first bit data DQ-270 is at a high level, the third switch NMOS transistor KN03 is turned on, and the fourth switch NMOS transistor KN04 is turned on based on the CLK-0. In this case, the second adjustment NMOS transistor TN02 pulls down the potential at the second end of the third NMOS transistor N03, the first adjustment NMOS transistor TN01 pulls down the potential at the second end of the fourth NMOS transistor N04, the voltage value of the first reference voltage Vref1 is greater than the voltage value of the second reference voltage Vref2, and the pull-down capability of the first adjustment NMOS transistor TN01 is greater than the pull-down capability of the second adjustment NMOS transistor TN02, such that the degree of the potential drop at the second end of the third NMOS transistor N03 is less than the degree of the potential drop at the second end of the fourth NMOS transistor N04, which is equivalent to increasing the value of the initial reference voltage Vref. Therefore, the falling initial input data DQ can fall to a voltage value less than that of the initial reference voltage Vref within a relatively short change time, thereby ensuring that in practice, the potential at the second end of the third NMOS transistor N03 is greater than the potential at the second end of the fourth NMOS transistor N04. For the latch circuit 340, the potential at the first output end OUT is less than the potential at the second output end OUTB and the DQ-0 is at a low level.

If the previous first bit data DQ-270 is at a low level, the fifth switch NMOS transistor KN05 is turned on, and the sixth switch NMOS transistor KN06 is turned on based on the CLK-0. In this case, the fourth adjustment NMOS transistor TN04 pulls down the potential at the second end of the third NMOS transistor N03, the third adjustment NMOS transistor TN03 pulls down the potential at the second end of the fourth NMOS transistor N04, the voltage value of the first reference voltage Vref1 is greater than the voltage value of the second reference voltage Vref2, and the pull-down capability of the fourth adjustment NMOS transistor TN04 is greater than the pull-down capability of the third adjustment NMOS transistor TN03, such that the degree of the potential drop at the second end of the third NMOS transistor N03 is greater than the degree of the potential drop at the second end of the fourth NMOS transistor N04, which is equivalent to decreasing the value of the initial reference voltage Vref. However, since the previous one-bit data DQ-270 is at a low level, the DQ-O still needs to be sampled at a low level. The initial input data DQ does not change greatly and the decreased initial reference voltage Vref does not affect the sampling of the data receiving circuit, and thus, the DQ-0 is still sampled at a low level.

It should be noted that for the circuit shown in FIG. 7, sampling is performed only once on the same input data, such that the power consumption of the data receiving circuit that applies the circuit is also reduced correspondingly.

With continued reference to FIG. 7, in some embodiments, the latch circuit 340 further includes a third reset transistor FP03, where the control terminal is used to receive the i-th clock, the first end is used to receive the power supply voltage VDD, and the second end is connected to the first end of the first NMOS transistor N01; and a fourth reset transistor FP04, where the control terminal is used to receive the i-th clock, the first end is used to receive the power supply voltage VDD, and the second end is connected to the second end of the second NMOS transistor N02. When input data is not generated, that is, when the i-th clock is invalid, the third reset transistor FP03 and the fourth reset transistor FP04 further reset the latch circuit 340.

In some embodiments, referring to FIG. 8, the data receiving circuit further includes a code generation circuit 103. The code generation circuit 103 is configured to receive a reference voltage generation code and a tap code BM corresponding to the previous one-bit data, generate a first reference voltage generation code (code1) based on the reference voltage generation code plus the tap code BM, and generate a second reference voltage generation code (code2) based on the reference voltage generation code minus the tap code BM. The first reference voltage generation code (code1) is used to generate a first reference voltage Vref1, and the second reference voltage generation code (code2) is used to generate a second reference voltage Vref2; the tap code BM is used to match the voltage adjustment step corresponding to the previous one-bit data DQ-C.

The reference voltage generation code may be the configuration value MR10 OP <7:0> of the mode register in the memory or configured by the memory manufacturer. The code generation circuit 103 is used to identify the configuration value MR10 OP<7:0> in the mode register to obtain the reference voltage generation code. The value of the tap code BM corresponds to the influence magnitude of the previous one-bit data, that is, to control the extent to which the previous one-bit data adjusts the current data, and thus, the problem of memory ISI can be solved in a better way.

In some embodiments, a plurality of tap codes BM are stored in a register of the memory. The memory controls the register to output different tap codes BM based on the strength of the intersymbol interference, so as to realize the generation of the tap code BM corresponding to the previous one-bit data. The strength of the intersymbol interference of the memory depends on the frequency of transmitted data and the channel quality of the data transmission channel.

With continued reference to FIG. 8, in some embodiments, the data receiving circuit further includes a resistance voltage divider 104. The resistance voltage divider 104 is configured to generate a first reference voltage Vref1 based on the first reference voltage generation code (code1) and generate a second reference voltage Vref2 based on the second reference voltage generation code (code2).

Specifically, the resistance voltage divider 104 is a voltage divider circuit formed by a plurality of resistors connected in series between the power supply voltage VDD and the ground. Through different voltage generation codes, different output nodes in the resistance voltage divider 104 are indicated for output, thereby outputting the first reference voltage Vref1 and the second reference voltage Vref2, with voltage values between 0 and VDD.

For the code generation circuit 103, referring to FIG. 9, the code generation circuit 103 includes a generation circuit 401, an identification circuit 402, a first processing circuit 403, and a second processing circuit 404. The generation circuit 401 is configured to identify the reference voltage generation code to generate an initial reference voltage generation code (code). The control circuit 402 is configured to provide the tap code BM to the first processing circuit 403 and the second processing circuit 404. The first processing circuit 403 is configured to generate a first reference voltage generation code (code1) based on the initial reference voltage generation code (code) plus the tap code BM. The second processing circuit 404 is configured to generate a second reference voltage generation code (code2) based on the initial reference voltage generation code (code) minus the tap code BM.

In some embodiments, the reference voltage generation code may be the configuration value MR10 OP<7:0> of the mode register in the associated memory. In the example, the generation circuit 401 multiplexes the existing reference voltage generation logic, thereby saving the area of the code generation circuit.

In one example, assuming that the initial reference voltage generation code (code) is used to generate 0.6 VDD and the adjustment range of the first reference voltage generation code (code1) and the second reference voltage generation code is from 0 VDD to +0.2 VDD. In this case, the voltage range of the first reference voltage Vref1 generated by the resistance voltage divider 104 is from 0.6 VDD to 0.8 VDD and the voltage range of the second reference voltage Vref2 is from 0.4 VDD to 0.6 VDD.

In some embodiments, the code generation circuit 103 is further used to generate a fixed reference voltage to increase the flexibility of the resistance voltage divider 104. Referring to FIG. 10, the generation circuit 601 is further configured to generate a reference voltage generation code corresponding to the reference voltage with a preset value or identify the configuration value MR10 OP<7:0> of the mode register in the associated memory to generate the initial reference voltage generation code (code).

In one example, assuming that an initial reference voltage generation code generated by the configuration value MR10 OP<7:0> of the mode register in the associated memory is used to generate 0.6 VDD, and an initial reference voltage generation code generated by the reference voltage with a fixed value is used to generate 0.5 VDD, the adjustment range of the first reference voltage generation code (code1) and the second reference voltage generation code is from 0 VDD to +0.2 VDD. In this case, the voltage range of the first reference voltage Vref1 generated by the resistance voltage divider 104 is from 0.5 VDD to 0.8 VDD, the voltage range of the second reference voltage Vref2 is from 0.3 VDD to 0.6 VDD, and the voltage ranges of the first reference voltage Vref1 and the second reference voltage Vref2 generated by the resistance voltage divider 104 are larger and thus have better flexibility.

Specifically, the generation circuit 601 includes a first sub-generation circuit 610, a second sub-generation circuit 620, and a selection circuit 630. The first sub-generation circuit 601 is configured to identify the configuration value MR10 OP<7:0> of the mode register in the memory to generate the first reference code. The second sub-generation circuit 620 is configured to generate the second reference code corresponding to the reference voltage with a preset value. The second reference code corresponding to the reference voltage with the preset value is implemented by receiving the code A. The selection circuit 630 is configured to select, based on the selection signal Sel, whether to generate the initial reference voltage generation code (code) based on the first reference code or the second reference code.

It should be noted that the control circuit 602, the first processing circuit 603, and the second processing circuit 604 in the example of FIG. 10 respectively correspond to the identification circuit 402, the first processing circuit 403, and the second processing circuit 404 in the example of FIG. 9. The description for the example of FIG. 9 is referred to for the corresponding description, and details will not be described in the embodiment.

In some embodiments, referring to FIG. 11, the generation circuit 701 is configured to generate the initial reference voltage generation code (code) based on the adjusting code (code4). The adjusting code (code4) is obtained based on the eye diagram data of the associated memory in the test mode, so as to generate the optimal initial reference voltage Vref for the eye diagram of the memory. In this example, since the generation circuit 701 generates the initial reference voltage generation code (code) based on the adjusting code (code4) and the adjusting code (code4) is obtained based on the eye diagram data of the associated memory in the test mode, the protection effect against the memory ISI is optimal in this case and a better data eye diagram can be acquired.

It should be noted that the control circuit 702, the first processing circuit 703, and the second processing circuit 704 in the example of FIG. 11 respectively correspond to the identification circuit 402, the first processing circuit 403, and the second processing circuit 404 in the example of FIG. 9. The description for the example of FIG. 9 is referred to for the corresponding description, and details will not be described in the embodiment.

In some embodiments, referring to FIG. 12, the code generation circuit 103 is further used to combine the examples of FIGS. 9 and 11, that is, to generate the initial reference voltage generation code (code) based on the configuration value MR10 OP<7:0> of the mode register in the memory or the adjusting code (code4).

Specifically, the generation circuit 801 includes a first sub-generation circuit 810, a second sub-generation circuit 802, and a selection circuit 830. The first sub-generation circuit 810 is configured to identify the configuration value MR10 OP<7:0> of the mode register in the memory to generate the first reference code. The second sub-generation circuit 802 is configured to generate the second reference code based on the adjusting code (code4). The selection circuit 830 is configured to select, based on the selection signal Sel, whether to generate the initial reference voltage generation code (code) based on the first reference code or the second reference code.

It should be noted that the control circuit 802, the first processing circuit 803, and the second processing circuit 804 in the example of FIG. 12 respectively correspond to the identification circuit 402, the first processing circuit 403, and the second processing circuit 404 in the example of FIG. 9. The description for the example of FIG. 9 is referred to for the corresponding description, and details will not be described in the embodiment.

The data receiving circuit provided according to the embodiments adjusts the current input data based on the feedback from the previous multi-bit input data, significantly reducing the impact of ISI on the current input data. Additionally, the area of the circuit is compressed as much as possible without affecting the storage capacity of the memory. In addition, in the data receiving circuit, sampling is performed only once on the same input data, such that the power consumption of the circuit is also reduced correspondingly.

It should be noted that the features disclosed in the data receiving circuit provided according to the above embodiments may be combined in any manner without conflict to obtain new embodiments of the data receiving circuit.

Another embodiment of the present disclosure provides a memory. The memory includes the data receiving circuit provided according to the above embodiments, which is at least beneficial to improving the problem of intersymbol interference in the memory.

The memory may be a storage unit or apparatus based on semiconductor devices or components. For example, the memory apparatus may be a volatile memory, such as a dynamic random access memory DRAM, a synchronous dynamic random access memory SDRAM, a double data rate synchronous dynamic random access memory DDR SDRAM, a low-power double data rate synchronous dynamic random access memory LPDDR SDRAM, a graphics double data rate synchronous dynamic random access memory GDDR SDRAM, a 2rd double data rate synchronous dynamic random access memory DDR2 SDRAM, a 3th double data rate synchronous dynamic random access memory DDR3 SDRAM, a double data rate fourth generation synchronous dynamic random access memory DDR4 SDRAM, a thyristor random access memory TRAM, or the like; or the memory apparatus may be a non-volatile memory, such as a phase change random access memory PRAM, a magnetic random access memory MRAM, a resistive random access memory RRAM, or the like.

In some examples, N and M may be four.

It can be inferred from the foregoing analysis that the memory improves the problem of intersymbol interference while relatively compressing the area of the data receiving circuit as much as possible, without affecting the storage capacity of the memory. In addition, in the data receiving circuit, sampling is performed only once on the same input data, such that the power consumption of the circuit is correspondingly reduced.

Those of ordinary skill in the art can understand that the above embodiments are specific implementations of the present disclosure. In practical applications, various changes may be made in form and detail without departing from the spirit and scope of the embodiments of the present disclosure. Any person skilled in the art can make respective changes and modifications without departing from the spirit and scope of the embodiments of the present disclosure. Therefore, the protection scope of the embodiments of the present disclosure is defined by the scope of the claims.

What is claimed is:

1. A data receiving circuit, comprising:

a comparator for receiving initial input data and an initial reference voltage, wherein the comparator is configured to amplify a voltage difference between the initial input data and the initial reference voltage and output double-ended signals as a result of the amplification; and a plurality of data paths, comprising a first data path to an M-th data path, numbered in ascending order of natural numbers, with an i-th data path being any one of the plurality of data paths, and $1 \leq i \leq M$, $M \geq 2$;

wherein each of the plurality of data paths receives the double-ended signals, the i-th data path is configured to sample based on an i-th clock to obtain an i-th bit data, and the i-th data path comprises:

an adjustment circuit for receiving a previous second bit data to a previous N-th bit data prior to the i-th bit data, with $2 \leq N \leq M$, wherein the adjustment circuit is configured to adjust a voltage difference between the double-ended signals based on the previous second bit data to the previous N-th bit data to generate double-ended adjustment signals; and a sampling circuit for receiving the double-ended adjustment signals, the i-th clock, and a previous first bit data prior to the i-th bit data, wherein the sampling circuit is configured to, during a valid period of the i-th clock, compare and amplify a voltage difference between the double-ended adjustment signals based on the previous first bit data and output the i-th bit data.

2. The data receiving circuit according to claim 1, wherein the sampling circuit further receives a first reference voltage and a second reference voltage, wherein a voltage value of the first reference voltage is greater than a voltage value of the second reference voltage; and comparing and amplifying the voltage difference between the double-ended adjustment signals based on the previous first bit data and outputting the i-th bit data comprises: selecting, based on the previous first bit data, to equivalently increase or equivalently decrease the voltage difference between the double-ended adjustment signals by using a voltage difference between the first reference voltage and the second reference voltage, and comparing and amplifying the voltage difference between the double-ended adjustment signals to output the i-th bit data.

3. The data receiving circuit according to claim 2, wherein the double-ended adjustment signals comprise a first adjustment sub-signal and a second adjustment sub-signal; and the sampling circuit comprises:

a selection adjustment circuit configured to select, during a valid period of the i-th clock and based on a value of the previous first bit data, to use the first reference voltage to adjust a current of a branch where the first adjustment sub-signal is located and use the second reference voltage to adjust a current of a branch where the second adjustment sub-signal is located;

or, to use the first reference voltage to adjust a current of a branch where the second adjustment sub-signal is located and use the second reference voltage to adjust a current of a branch where the first adjustment sub-signal is located; and a latch circuit configured to sample and latch the i-th bit data based on the i-th clock.

4. The data receiving circuit according to claim 3, wherein the selection adjustment circuit comprises:

a first n-channel metal-oxide semiconductor (NMOS) transistor, with a control terminal for receiving the first adjustment sub-signal and a first end connected to the latch circuit;

a second NMOS transistor, with a control terminal for receiving the second adjustment sub-signal, a first end connected to the latch circuit, and a second end connected to a second end of the first NMOS transistor;

a first switch NMOS transistor, with a control terminal for receiving a power supply voltage and a first end connected to the second end of the first NMOS transistor;

a second switch NMOS transistor, with a control terminal for receiving the i-th clock, a first end connected to a second end of the first switch NMOS transistor, and a second end being grounded;

a first adjustment NMOS transistor, with a control terminal for receiving the first reference voltage and a first end connected to the first end of the second NMOS transistor;

a second adjustment NMOS transistor, with a control terminal for receiving the second reference voltage, a first end connected to the first end of the first NMOS transistor, and a second end connected to a second end of the first adjustment NMOS transistor;

a third switch NMOS transistor, with a control terminal for receiving the previous first bit data and a first end connected to the second end of the second adjustment NMOS transistor;

a fourth switch NMOS transistor, with a control terminal for receiving the i-th clock, a first end connected to a second end of the third switch NMOS transistor, and a second end being grounded;

a third adjustment NMOS transistor, with a control terminal for receiving the second reference voltage and a first end connected to the first end of the second NMOS transistor;

a fourth adjustment NMOS transistor, with a control terminal for receiving the first reference voltage, a first end connected to the first end of the first NMOS transistor, and a second end connected to a second end of the third adjustment NMOS transistor;

a fifth switch NMOS transistor, with a control terminal for receiving an inverted signal of the previous first bit data and a first end connected to the second end of the fourth adjustment NMOS transistor; and a sixth switch NMOS transistor, with a control terminal for receiving the i-th clock, a first end connected to a second end of the fifth switch NMOS transistor, and a second end being grounded.

5. The data receiving circuit according to claim 4, wherein the latch circuit comprises:

a first p-channel metal-oxide semiconductor (PMOS) transistor, with a first end for receiving the power supply voltage;

a second PMOS transistor, with a first end for receiving the power supply voltage;

a third NMOS transistor, with a control terminal connected to a control terminal of the first PMOS transistor, a first end connected to a second end of the first PMOS transistor, and a second end connected to the first end of the first NMOS transistor;

a fourth NMOS transistor, with a control terminal connected to a control terminal of the second PMOS transistor, a first end connected to a second end of the second PMOS transistor, and a second end connected to the second end of the second NMOS transistor, wherein the control terminal of the third NMOS transistor is further connected to the first end of the fourth NMOS transistor to serve as a first output end of the latch circuit, the control terminal of the fourth NMOS transistor is further connected to the first end of the third NMOS transistor to serve as a second output end of the latch circuit, the first output end is used to output the i-th bit data, and the second output end is used to output an inverted signal of the i-th bit data;

a first reset PMOS transistor, with a control terminal for receiving the i-th clock, a first end for receiving the power supply voltage, and a second end connected to the second end of the first PMOS transistor; and a second reset PMOS transistor, with a control terminal for receiving the i-th clock, a first end for receiving the power supply voltage, and a second end connected to the second end of the second PMOS transistor.

6. The data receiving circuit according to claim 5, wherein the latch circuit further comprises:

a third reset PMOS transistor, with a control terminal for receiving the i-th clock, a first end for receiving the power supply voltage, and a second end connected to the first end of the first NMOS transistor; and a fourth reset PMOS transistor, with a control terminal for receiving the i-th clock, a first end for receiving the power supply voltage, and a second end connected to the second end of the second NMOS transistor.

7. The data receiving circuit according to claim 1, further comprising: a code generation circuit configured to receive a reference voltage generation code and a tap code corresponding to a previous one-bit data, generate a first reference voltage generation code based on the reference voltage generation code plus the tap code, and generate a second reference voltage generation code based on the reference voltage generation code minus the tap code, wherein the first reference voltage generation code is used to generate a first reference voltage, the second reference voltage generation code is used to generate a second reference voltage, and the tap code is used to match a voltage adjustment step corresponding to the previous first bit data.

8. The data receiving circuit according to claim 7, further comprising: a resistance voltage divider configured to generate the first reference voltage based on the first reference voltage generation code and generate the second reference voltage based on the second reference voltage generation code.

9. The data receiving circuit according to claim 7, wherein the code generation circuit comprises:

a generation circuit configured to generate initial reference voltage generation code; and a control circuit configured to provide the tap code to a first processing circuit and a second processing circuit, wherein the first processing circuit is configured to generate the first reference voltage generation code based on the initial reference voltage generation code plus the tap code; and the second processing circuit is configured to generate the second reference voltage generation code based on the initial reference voltage generation code minus the tap code.

10. The data receiving circuit according to claim 9, wherein the generation circuit is configured to generate the reference voltage generation code corresponding to a reference voltage with a preset value or identify a configuration value of a mode register in an associated memory to generate the initial reference voltage generation code.

11. The data receiving circuit according to claim 10, wherein the generation circuit comprises:

a first sub-generation circuit configured to identify the configuration value of the mode register in the associated memory to generate a first reference code;

a second sub-generation circuit configured to generate a second reference code corresponding to the reference voltage with the preset value; and a selection circuit configured to select, based on a selection signal, whether to generate the initial reference voltage generation code based on the first reference code or the second reference code.

12. The data receiving circuit according to claim 9, wherein the generation circuit is configured to generate the initial reference voltage generation code based on an adjusting code, wherein the adjusting code is obtained based on eye diagram data of an associated memory in a test mode.

13. The data receiving circuit according to claim 12, wherein the generation circuit comprises:

a first sub-generation circuit configured to identify a configuration value of a mode register in the associated memory to generate a first reference code;

a second sub-generation circuit configured to generate a second reference code based on the adjusting code; and a selection circuit configured to select, based on a selection signal, whether to generate the reference voltage generation code based on the first reference code or the second reference code.

14. A memory, comprising the data receiving circuit according to claim 1.

15. The memory according to claim 14, wherein N and M are four.

* * * * *